United States Patent
Boss et al.

(10) Patent No.: US 10,257,805 B2
(45) Date of Patent: *Apr. 9, 2019

(54) PREVENTING DRIVER DISTRACTION FROM INCOMING NOTIFICATIONS

(71) Applicant: International Business Machines Corporation, Armonk, NY (US)

(72) Inventors: Gregory J. Boss, Saginaw, MI (US); Jeremy R. Fox, Georgetown, TX (US); Andrew R. Jones, Round Rock, TX (US); Kevin C. McConnell, Austin, TX (US); John E. Moore, Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,649

(22) Filed: Oct. 9, 2017

(65) Prior Publication Data

US 2018/0035402 A1 Feb. 1, 2018

Related U.S. Application Data

(63) Continuation of application No. 15/151,545, filed on May 11, 2016, now Pat. No. 9,826,500.

(51) Int. Cl.
*H04W 68/00* (2009.01)
*H04W 24/08* (2009.01)
(Continued)

(52) U.S. Cl.
CPC ..... *H04W 68/005* (2013.01); *H04M 1/72552* (2013.01); *H04M 1/72569* (2013.01);
(Continued)

(58) Field of Classification Search
CPC ....... H04W 4/027; H04W 48/04; H04W 4/12; H04W 4/02; H04W 68/005; H04W 24/08;
(Continued)

(56) References Cited

U.S. PATENT DOCUMENTS 6,420,975 B1   7/2002   DeLine et al.
8,401,589 B2   3/2013   Liu et al.
(Continued)

FOREIGN PATENT DOCUMENTS

CN   104769568 A       7/2015
EP     1905656 A1 *   4/2008   ............ B60W 40/09

OTHER PUBLICATIONS

McNamara, Paul, "Researchers sound alarm about the role of any and all phone sounds in distracted driving", Network World Jul. 14, 2015 10:34 AM PT, 1 page, <http://www.networkworld.com/article/2948212/mobile/researchers-sound-alarm-about-the-role-of-any-and-all-phone-sounds-in-distracted-driving.html?phint=newt%3Dnetworkworld_network_systems_management_alert&phint=idg_eid%3D92adb73c53733efff0ba10b250684ae1#tk.NWWNLE_nlt_network_systems_2015-07-15>.

(Continued)

*Primary Examiner* — Daniel Lai
(74) *Attorney, Agent, or Firm* — Alexander G. Jochym; Brian M. Restauro

(57) ABSTRACT

Driving condition data is determined. The driving condition data identifies one or more driving actions that require more driver attention and one or more driving actions that require less driver attention. An indication is received that a user has a mobile device and is driving a vehicle. The surrounding environment of the vehicle is monitored. An incoming notification on the mobile device is received. A distraction value is determined. The distraction value is based on the one or more driving actions and the surrounding environ- (Continued)

ment. The incoming notification is modified based on the distraction value.

17 Claims, 5 Drawing Sheets

(51) Int. Cl.
    *H04M 1/725*     (2006.01)
    *H04M 1/60*     (2006.01)
    *G06K 9/00*     (2006.01)
    *H04W 88/02*     (2009.01)

(52) U.S. Cl.
    CPC ........ *H04W 24/08* (2013.01); *G06K 9/00845* (2013.01); *H04M 1/6075* (2013.01); *H04M 1/6091* (2013.01); *H04W 88/02* (2013.01)

(58) Field of Classification Search
    CPC ... H04W 88/02; H04W 4/40; H04M 1/72577; H04M 1/72569; H04M 1/6091; H04M 1/6075; H04M 1/6083; H04M 1/72552; G06K 9/008445; G06K 9/00268; G06K 9/00798; G06K 9/00825; G06K 9/00832; G06K 9/00838; G05D 1/0088; G05D 2201/0213; G05D 1/0061; G05D 1/0055; G05D 1/0016; G05D 1/0022; G05D 1/0033; G05D 1/021; G05D 1/0214; G05D 1/0221; G05D 1/0246; G05D 1/0285; G05D 1/0289; G08G 1/166; G08G 1/167; G08G 1/962; G08G 1/096775; G08G 1/16; G08G 1/0129; G08G 1/096725; G08G 1/096741; G08G 1/0141; G08G 1/048; G08G 1/0967; G08G 1/096716; G08G 1/096783; G08G 1/163

See application file for complete search history.

(56) References Cited

U.S. PATENT DOCUMENTS

| | | | |
|---|---|---|---|
| 8,914,014 B2 | 12/2014 | Vidal et al. | |
| 8,994,492 B2 | 3/2015 | Farhan et al. | |
| 9,185,526 B2 | 11/2015 | Guba et al. | |
| 9,198,575 B1 | 12/2015 | Blacutt et al. | |
| 9,707,928 B2 | 7/2017 | Skelton | |
| 9,751,534 B2 | 9/2017 | Fung et al. | |
| 2002/0128000 A1 | 9/2002 | do Nascimento, Jr. | |
| 2004/0060050 A1 | 3/2004 | Bieringer | |
| 2004/0127198 A1 | 7/2004 | Roskind et al. | |
| 2004/0209594 A1* | 10/2004 | Naboulsi | B60R 11/0264 455/404.1 |
| 2005/0128092 A1* | 6/2005 | Bukman | A61B 5/18 340/576 |
| 2005/0170849 A1 | 8/2005 | McClelland | |
| 2005/0232461 A1 | 10/2005 | Hammoud | |
| 2008/0077882 A1 | 3/2008 | Kramer et al. | |
| 2009/0224931 A1 | 9/2009 | Dietz et al. | |
| 2009/0298482 A1 | 12/2009 | Yen et al. | |
| 2010/0035632 A1 | 2/2010 | Catten | |
| 2010/0128863 A1 | 5/2010 | Krum et al. | |
| 2010/0201478 A1 | 8/2010 | Veen et al. | |
| 2010/0228469 A1 | 9/2010 | Varadarajan | |
| 2011/0021234 A1 | 1/2011 | Tibbitts et al. | |
| 2012/0271484 A1 | 10/2012 | Feit et al. | |
| 2013/0090103 A1 | 4/2013 | Kim et al. | |
| 2013/0121481 A1 | 5/2013 | Mikan et al. | |
| 2014/0129001 A1* | 5/2014 | Staudenmaier | G08B 21/06 700/79 |
| 2014/0172467 A1* | 6/2014 | He | B60K 28/066 705/4 |
| 2014/0306826 A1 | 10/2014 | Ricci | |
| 2015/0031349 A1 | 1/2015 | Hill et al. | |
| 2015/0056973 A1 | 2/2015 | Efrati | |
| 2015/0172442 A1 | 6/2015 | Wright et al. | |
| 2015/0217825 A1 | 8/2015 | Tamura | |
| 2015/0266377 A1 | 9/2015 | Hampiholi et al. | |
| 2015/0266484 A1 | 9/2015 | Moran et al. | |
| 2015/0373666 A1 | 12/2015 | Malahy et al. | |
| 2016/0014262 A1 | 1/2016 | Hodges et al. | |
| 2017/0043781 A1* | 2/2017 | Prakah-Asante | B60W 40/08 |

OTHER PUBLICATIONS

"Understanding the distracted brain", Why Driving While Using Hands-Free Cell Phones Is Risky Behavior, National Safety Council, White Paper Apr. 2012, © 2012 National Safety Council, 23 pages.

"What is distracted driving?", Facts and Statistics, Last printed Feb. 25, 2016, 2 Pages, <http://www.distraction.gov/stats-research-laws/facts-and-statistics.html>.

Boss et al., "Preventing Driver Distraction From Incoming Notifications", U.S. Appl. No. 15/151,545, filed May 11, 2016, 35 pages.

IBM, "List of Patent Applications Treated As Related", Appendix P, Dated Oct. 9, 2017, 2 pages.

\* cited by examiner

| DRIVER ACTION | DISTRACTION VALUE |
|---|---|
| VEHICLE SPEED (MPH): 0 / 1 TO 10 / 11 TO 20 / 21 TO 30 / ABOVE 30 | 0 / 5 / 10 / 15 / 20 |
| DRIVING IN GOOD / FAIR / POOR WEATHER CONDITIONS | 5 / 10 / 15 |
| DRIVING DURING DAY / NIGHT | 5 / 15 |
| DRIVING IN LIGHT / MODERATE / HEAVY TRAFFIC | 5 / 10 / 15 |
| STRAIGHT LINE DRIVING / CORNERING | 5 / 10 |
| DRIVING FAMILIAR ROUTE / NEW ROUTE | 5 / 10 |
| DRIVER ACTIONS: PAYING ATTENTION / DISTRACTED | 5 / 15 |
| NUMBER OF OCCUPANTS: 1 / 2 / MORE THAN 2 | 5 / 10 / 15 |
| DRIVING IN WARNING AREA (SCHOOL ZONE, CONSTRUCTION, ETC.) | 20 |

FIG. 3A

| DISTRACTION VALUE | TYPE OF INCOMING NOTIFICATION MODIFICATION |
|---|---|
| $0 \leq DV \leq 24$ | NO CHANGE (USE DEVICE DEFAULT) |
| $25 \leq DV \leq 44$ | CHANGE AUDIBLE TO VIBRATE, ACCEPT VISUAL |
| $45 \leq DV \leq 59$ | CHANGE AUDIBLE TO VISUAL |
| $45 \leq DV \leq 59$ | CHANGE VIBRATE TO VISUAL |
| $DV \geq 60$ | CHANGE AUDIBLE TO SILENT |
| $DV \geq 60$ | CHANGE VIBRATE TO SILENT |
| $DV \geq 60$ | CHANGE VISUAL TO SILENT |
| NOTE : MOST TO LEAST DISTRACTING NOTIFICATION TYPE - AUDIBLE TO VIBRATE TO VISUAL TO SILENT | |

PREVENTING DRIVER DISTRACTION FROM INCOMING NOTIFICATIONS

BACKGROUND

The present invention relates generally to the field of notifications from a mobile device, and more particularly to preventing driver distraction from incoming notifications from the mobile device.

Mobile devices of many types such as smartphones, smartwatches, phablets, tablets, wearable technology, and the like are prominent today. These mobile devices also provide users with an easy way to communicate with other users. Methods of communication include cellular phone calls, texting via short message service and/or multimedia messaging service, video calling, and the use of social media websites. Notifications to a user of these methods of communication include an audible notification such as a ringtone for a phone call, other audible sounds such as a beep, chime, or buzz, visual notification such as a blinking light, and haptic notification such as vibration.

SUMMARY OF THE INVENTION

Embodiments of the present invention include a method, computer program product, and system for preventing driver distraction from incoming notifications from a mobile device. In one embodiment, driving condition data is determined. The driving condition data identifies one or more driving actions that require more driver attention and one or more driving actions that require less driver attention. An indication is received that a user has a mobile device and is driving a vehicle. The surrounding environment of the vehicle is monitored. An incoming notification on the mobile device is received. A distraction value is determined. The distraction value is based on the one or more driving actions and the surrounding environment. The incoming notification is modified based on the distraction value.

BRIEF DESCRIPTION OF THE DRAWINGS

FIG. 3A is an example table of driver actions and distraction values, in accordance with an embodiment of the present invention;

FIG. 3B is an example table of distraction value range and notification modifications, in accordance with an embodiment of the present invention.

DETAILED DESCRIPTION

Embodiments of the present invention provide for preventing driver distraction from incoming notifications from a mobile device. Any number of notifications from a mobile device include, but are not limited to, phone calls, text messages, social media website notifications, and the like, may distract drivers. Driver distraction may result in property damage (e.g., damage to the vehicle driven by the driver, another vehicle, or any property hit by the vehicle driven by the driver) or injury to the driver, passengers in the vehicle with the driver, or innocent bystanders.

Embodiments of the present invention recognize that there may be a method, computer program product, and computer system for preventing driver distraction from incoming notifications from a mobile device. The method, computer program product, and computer system may monitor the real time driving environment of the driver and alter an incoming notification to a mobile device of the driver based on the driving environment and the current driver action (i.e., is the driver stopped in a traffic jam or is the driver moving at seventy miles per hour (mph) on the freeway). The result of altering an incoming notification may be to prevent distraction(s) that may cause an accident and personal injury.

The present invention will now be described in detail with reference to the Figures.

Figure 1:
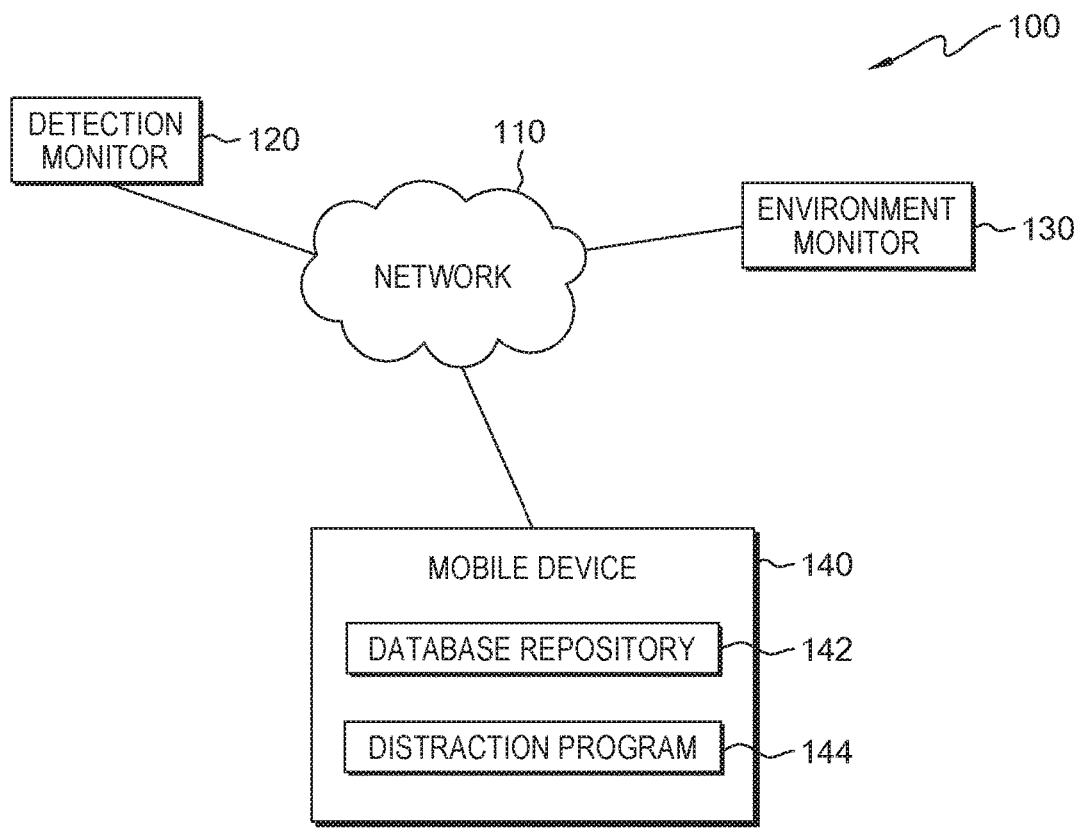
FIG. 1 depicts a functional block diagram of a data processing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes detection monitor 120, environment monitor 130, and mobile device 140, interconnected over network 110. In example embodiments, computing environment 100 may include other computing devices (not shown) such as smartwatches, cell phones, smartphones, phablets, tablet computers, laptop computers, desktop computers, other computer servers or any other computer system known in the art, interconnected with mobile device 140 over network 110.

In example embodiments, mobile device 140 may connect to network 110, which enables mobile device 140 to access other computing devices and/or data not directly stored on mobile device 140. Network 110 may be, for example, a local area network (LAN), a telecommunications network, a wide area network (WAN) such as the Internet, or any combination of the three, and include wired, wireless, or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between detection monitor 120, environment monitor 130, mobile device 140, and any other computing device connected to network 110, in accordance with embodiments of the present invention. In an embodiment, data collected and/or analyzed by any of detection monitor 120 and environment monitor 130 may be received by another computing device (not shown) and communicated to mobile device 140 via network 110.

In an embodiment, detection monitor 120 may be a stand-alone computing device or a part of a system, which functions to determine whether a user is sitting in the driver seat in a moving vehicle. According to an embodiment of the present invention, one such system includes proactive service-controls which use the time of day and location based services to determine that a mobile device is in a moving vehicle as well as reactive position-awareness techniques which use near-field communication (NFC) to determine that the mobile device is being operated by a user in the driver seat of the vehicle. In another embodiment, a mobile device may be linked to a wireless LAN in a vehicle, which allows the mobile device to share Internet access with other computing devices both inside and outside the vehicle. Once connected to the wireless LAN of the vehicle, the determination has been made that the mobile device is in or near the vehicle. In an embodiment, a GPS (global positioning system) may be used to determine that the vehicle is moving and that the mobile device is in the moving vehicle. For example, a driver may place a bag holding a mobile device on the front passenger seat of a vehicle so even though the mobile device is not determined to be in the driver seat, it may be important to prevent driver distraction for the driver.

In an embodiment, environment monitor 130 is a system which monitors the real-time environment in which the driver is driving a vehicle. In an embodiment, the system may be fully incorporated into a vehicle. For example, the system may use the vehicle speedometer, navigation system, safety systems, and available cameras and sensors to determine the speed of the vehicle, the location of the vehicle (e.g., highway, city street, parking lot, etc.), the current traffic conditions, and what other objects are near the vehicle as well as the distance between the vehicle and the other objects near the vehicle. In another embodiment, a vehicle system may incorporate the mobile device of the driver. For example, the vehicle system may use a weather application included on the mobile device to determine the current weather where the vehicle is located. The inclusion of the current weather may allow the vehicle system to refine the real-time environment in which the driver is driving. In yet another embodiment, the vehicle system may include cameras or sensors inside the vehicle to determine whether other occupants are present inside the vehicle. For example, the real-time environment may be more distracting to the driver if children are present in the vehicle rather than only adults or if the vehicle includes no other occupants.

In an embodiment, mobile device 140 includes database repository 142 and distraction program 144. In embodiments of the present invention, mobile device 140 may be a laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In certain embodiments, mobile device 140 represents a computer system utilizing clustered computers and components (e.g., database server computers, application server computers, etc.) that act as a single pool of seamless resources when accessed by elements of computing environment 100. In general, mobile device 140 is representative of any electronic device or combination of electronic devices capable of executing computer readable program instructions. Computing environment 100 may include any number of mobile device 140. Mobile device 140 may include components as depicted and described in further detail with respect to FIG. 4, in accordance with embodiments of the present invention.

According to embodiments of the present invention, database repository 142 may be storage that may be written to and/or read by mobile device 140. In one embodiment, database repository 142 resides on mobile device 140. In other embodiments, database repository 142 may reside on any other device (not shown) in computing environment 100, in cloud storage or on another computing device accessible via network 110. In yet another embodiment, database repository 142 may represent multiple storage devices within mobile device 140. In an embodiment, database repository 142 may be managed by distraction program 144. In an alternative embodiment, database repository 142 may be managed by the operating system of mobile device 140, alone, or together with, distraction program 144. Database repository 142 may be implemented using any volatile or non-volatile storage media for storing information, as known in the art. For example, database repository 142 may be implemented with a tape library, optical library, one or more independent hard disk drives, multiple hard disk drives in a redundant array of independent disks (RAID), solid-state drives (SSD), or random-access memory (RAM). Similarly, database repository 142 may be implemented with any suitable storage architecture known in the art, such as a relational database, an object-oriented database, or one or more tables. In an embodiment of the present invention, distraction program 144 and any other applications (not shown) operating on mobile device 140 may store data to database repository 142.

Examples of data stored to database repository 142 include driver actions which require less driver attention (e.g., waiting at a stop light or in a traffic jam, driving over a bridge with no cross streets or turns, driving in light traffic conditions with few other vehicles around, driving late at night with fewer vehicles on the road, and the like). Examples of other data stored to database repository 142 include driver actions which require more driver attention (e.g., driving through an intersection, driving in heavy traffic with many other vehicles around, driving in poor weather conditions such as a thunderstorm or with white-out conditions, and the like). Examples of additional data stored to database repository 142 include location based accident history (e.g., an on-ramp may have a high incidence of accidents due to a short merge lane), a driver history (e.g., the number of accidents for the driver, the number of moving violations for the driver, the average speed of the driver in relation to the posted speed limit, etc.), a history of the routes driven by the driver (i.e., where does the driver most often drive versus where has the driver never driven), and the like. Even more examples of data stored to database repository 142 include social media content relevant to driving such as users commenting on a construction zone, a hazard (e.g., a stopped vehicle) in or on the shoulder of the road, a pothole in the road, a speed trap set up by law enforcement, and the like.

According to embodiments of the present invention, distraction program 144 may be a program, subprogram of a larger program, application, plurality of applications, or mobile application software which functions to prevent driver distraction from incoming notifications from a mobile device. A program is a sequence of instructions written by a programmer to perform a specific task. Distraction program 144 may run by itself but may be dependent on system software (not shown) to execute. In one embodiment, distraction program 144 functions as a stand-alone program residing on mobile device 140. In another embodiment, distraction program 144 may be included as a part of an operating system (not shown) of mobile device 140. In yet another embodiment distraction program 144 may work in conjunction with other programs, applications, etc., found on mobile device 140 or in computing environment 100. In yet another embodiment, distraction program 144 may be found on other computing devices (not shown) in computing environment 100 which are interconnected to mobile device 140 via network 110.

According to embodiments of the present invention, distraction program 144 functions to prevent driver distraction from incoming notifications from a mobile device. According to an embodiment of the present invention, distraction program 144 utilizes detection monitor 120 to determine if a user is driving a vehicle and environment monitor 130 to determine the user (i.e., driver) environment in order to determine if an incoming notification to mobile device 140 should be altered to prevent driver distraction from the incoming notification.

In an embodiment, distraction program 144 may include a user interface (not shown) that allows a user to interact with distraction program 144. A user interface is a program that provides an interface between a user and distraction program 144. A user interface refers to the information (such as graphic, text, and sound) a program presents to a user and the control sequences the user employs to control the program. There are many types of user interfaces. In one embodiment, the user interface can be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

Figure 2:
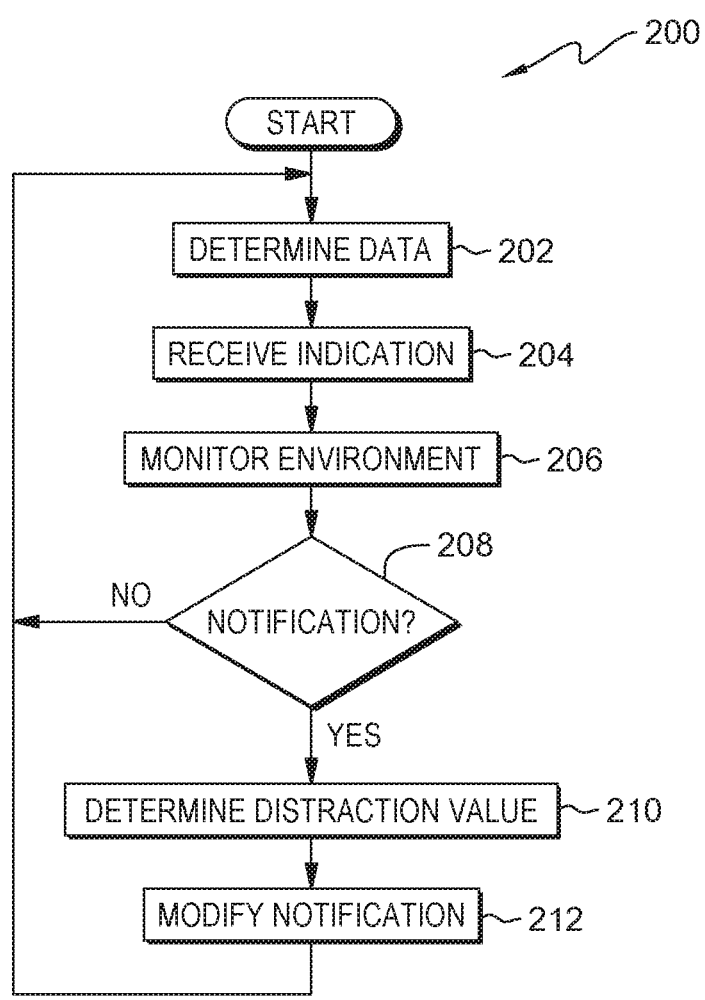
FIG. 2 depicts a flowchart of operational steps of a program for preventing driver distraction from incoming notifications from a mobile device, in accordance with an embodiment of the present invention.

FIG. 2 is a flowchart of workflow 200 depicting operational steps for preventing driver distraction from incoming notifications from a mobile device, in accordance with an embodiment of the present invention. In one embodiment, the steps of workflow 200 are performed by distraction program 144. In an alternative embodiment, steps of workflow 200 may be performed by any other program working with distraction program 144. In an embodiment, a user, via a user interface discussed previously, may invoke workflow 200 upon a user wanting to change distraction values within distraction program 144. In an alternative embodiment, a user, via a user interface discussed previously, may invoke workflow 200 upon powering on a mobile device.

In an embodiment, distraction program 144 determines data (step 202). In other words, distraction program 144 determines the driving condition data indicating which driving actions may require more attention by a driver and which driving actions may require less attention by a driver. In an embodiment, entities that may pre-define the driving actions that require more or less attention by a driver, include at least one of the following: a user, a government agency (e.g., the National Highway Transportation Safety Administration or NHTSA), an automobile company, an organization (e.g., the American Automobile Association (AAA) or National Safety Council), an insurance company, a law enforcement agency, and an educational institution. In an embodiment, a user may select which entity will provide the driving condition data. In another embodiment, the entity providing the driving condition data may be mandated to a user by a parent or other family member, by an insurance company, or by the local or state government where the user resides In another embodiment, the entity providing the driving condition data may offer an incentive to subscribe to the driving condition data offered by the entity (e.g., an insurance company may offer a discount if a user subscribes to the driving condition data supplied by the insurance company.

In an embodiment, driving actions that may require more attention by a driver include driving through an intersection, driving in heavy traffic with many other vehicles around, driving in poor weather conditions such as a thunderstorm or with white-out conditions from falling snow, turning left on a red flashing traffic signal, driving during rush hour, driving a never before driven route, in-car distractions (e.g., children, loud music, etc.), and situations where the driver may not be paying attention to the road, as monitored by an in-car camera (e.g., using the navigation system or eating breakfast). In an embodiment, driving actions which may require less attention by a driver include waiting at a stop light or in a traffic jam, driving over a bridge with no cross streets or turns, driving in light traffic conditions with few other vehicles around, driving late at night with fewer vehicles on the road, and driving on familiar routes. In an embodiment, the driving actions which may require more attention by a driver and the driving actions which may require less attention by a driver may be revised based on real-time data such as recent accident history data (e.g., if a particular intersection has an increased number of accidents since a "stop" sign was changed to a "yield" sign, the intersection would be indicated as requiring more driver attention). In another embodiment, the driving condition data is pre-defined and stored to database repository 142 on mobile device 140. For example, the driving condition data is stored to a smartphone of a user.

In an embodiment, distraction program 144 receives an indication (step 204). In other words, distraction program 144 receives an indication that a user has a mobile device and is inside a moving vehicle. In an embodiment, the indication may be received from detection monitor 120. In another embodiment, the indication may be received from another computing device (not shown) in computing environment 100. In an embodiment, a system may use proactive service-controls, which use the time of day and location based services to determine that a mobile device is in a moving vehicle as well as reactive position-awareness techniques, which use near-field communication (NFC) to determine that the mobile device is being operated by a user in the driver seat of the vehicle. In another embodiment, a mobile device may be linked to a wireless LAN in a vehicle, which allows the mobile device to share Internet access with other computing devices both inside and outside the vehicle. Once connected to the wireless LAN of the vehicle, the determination has been made that the mobile device is in or near the vehicle. A GPS may be used to determine that the vehicle is moving and that the mobile device is in the moving vehicle. For example, a user driving to play a pickup game of basketball may place a mobile device inside a gym bag placed on the passenger seat of a vehicle. In yet another embodiment, a personal area network (PAN) may be used where the mobile device of the user connects to the PAN. A PAN is a computer network used for data transmission among devices such as computers, telephones, and mobile devices. PANs may be used for communication among the devices themselves (intrapersonal communication), or for connecting to a higher-level network and the Internet (an uplink). A wireless personal area network (WPAN) is a PAN carried over a wireless network technology. In an embodiment, distraction program 144 receives a first indication from seat sensors built into the driver seat in a vehicle that a user is sitting in the driver seat. Distraction program 144 also receives a second indication that a mobile device has connected to a wireless LAN inside the vehicle as well as a third indication from a GPS that the vehicle is moving. For example, a user sitting in the driver seat is detected via sensors in the seat, the mobile device of the user connects to the wireless LAN in the vehicle, and the GPS in the mobile device determines that the vehicle is in motion.

In an embodiment, distraction program 144 monitors the environment (step 206). In other words, distraction program 144 utilizes various mechanisms to determine the local (i.e., surrounding) environment of the vehicle. In an embodiment, the environment is monitored by environment monitor 130. In another embodiment, the environment is monitored by another computing device (not shown) in computing environment 100. In an embodiment, the mechanisms used may include safety systems found in the vehicle such as the following: driver drowsiness detection (uses steering input, lane monitoring via cameras, or eye/face monitoring with a camera to detect when a driver is becoming drowsy), automatic braking (uses radar, video, infrared, ultrasonic, or other technologies to detect an imminent collision and to apply the brakes of the vehicle without driver input), infrared night vision (uses a thermographic camera to assist the driver to see beyond the headlights of the vehicle), adaptive headlights (which control the direction and range of the headlights to illuminate corners and maximize the distance the driver can see with affecting an on-coming driver), reverse backup sensors (which alert the driver to objects in the path of the driver when the vehicle is in reverse), backup camera (which alleviates the rear blindspot when the vehicle is in reverse), adaptive cruise control (which uses on-board radar or laser sensors to keep a vehicle at a constant speed while maintaining a safe distance from another vehicle in front the vehicle), lane departure warning systems (uses video, radar, or laser sensors to detect an unintended lane departure and warns the driver via a visual, audible and/or vibration signal, some systems also take steps to ensure the vehicle remains within the lane), tire pressure monitoring system (uses a pressure sensor to warn the driver of an under or over inflated tire), electronic stability control (which is a computerized technology that improves the stability of a vehicle by detecting and reducing loss of traction and loss of steering control), traction control system (part of the electronic stability control, uses a sensor to detect a change in wheel speed due to loss of traction and initiates braking as needed), anti-lock braking system (which allows the wheels of the vehicle to maintain tractive contact with the road surface while a user is braking preventing the wheels from locking up and avoiding uncontrolled skidding), electronic brakeforce distribution (part of the anti-lock braking system which varies the amount of force applied to each wheel based on road conditions, speed, loading, etc.), cornering brake control (part of the anti-lock braking system which distributes braking force during cornering), and emergency brake assist (which uses sensors to measure the speed an force with which the brake pedal is pushed to increase braking pressure in an emergency).

In an embodiment, in addition to the above safety systems, other vehicle systems such as the speedometer for determining how fast the vehicle is moving, on-board cameras and sensors for detecting nearby vehicles, occupants in the vehicle, and noise in the vehicle, the steering system to detect whether the vehicle is turning, the windshield wipers for indicating the presence of precipitation, and the like, may be used to monitor the driving environment. In an embodiment, mobile device 140 connects to a wireless LAN in the vehicle and distraction program 144 uses the vehicle safety systems to monitor the driving environment. For example, the mobile device of the user connects to the wireless LAN in the vehicle so that the environment of the vehicle may be monitored.

In an embodiment, distraction program 144 determines whether an incoming notification has been received (decision step 208). In other words, distraction program 144 determines whether a mobile device of a driver in a moving vehicle receives an incoming notification. In an embodiment, the incoming notification may be a notification for a phone call, a notification for an SMS (short message service) or MMS (multimedia message service) text message, a social media website notification, an e-mail notification, a weather notification, a news notification, and the like. In an embodiment (decision step 208, NO branch), distraction program 144 determines that an incoming notification has not been received by a mobile device; therefore, distraction program 144 proceeds to step 202 to continue preventing driver distraction from incoming notifications. In the embodiment (decision step 208, YES branch), distraction program 144 determines that an incoming notification has been received by a mobile device; therefore, distraction program 144 proceeds to step 210.

In an embodiment, distraction program 144 determines the distraction value (step 210). In other words, distraction program 144 uses the current driving environment (monitored in step 206), the indication that a user is driving a vehicle (step 204), and the indication that the mobile device of the user is in the vehicle (step 204) and determines a distraction value (DV). In an embodiment, the DV is a measure of how much a driver may be distracted based on the surrounding driving environment in concert with the current driving condition. In an embodiment, the DV for a given driving environment may be pre-determined by a user and stored to a database repository. In another embodiment, the DV may be pre-determined by a person other than the user (e.g., by a parent for a teenage driver, by an adult for an elderly parent, by a parole officer for a driver convicted of driving under the influence, etc.) and stored to a database repository. In yet another embodiment, the DV may be pre-determined by an entity (e.g., an insurance company offering incentives to a driver, a local, state, or federal government which sets speed limits, etc.) and stored to a database repository. In yet another embodiment, the DV may be calculated by an algorithm using the current driving environment and stored to a database repository. An example of such an algorithm would be to assign DV to driver actions as shown in table 300A in FIG. 3A and then sum the individual DV to determine an overall DV. In yet another embodiment, a particular DV may be weighted as determined by a person, an entity, or by distraction program 144 prior to summing the individual DV. For example, the DV for driving during the day may be multiplied by seventy-five percent so the DV is weighted less while the DV for driving at night may be multiplied by one-hundred twenty-five percent so the DV is weighted more and then the individual DV are added together to determine the overall DV. According to an embodiment of the present invention, the monitored driving environment is used in conjunction with DV table 300A in FIG. 3A, determined by a user and stored to database repository 142, to determine an overall DV for the current driving environment. For several examples, see the next paragraph.

Referring to table 300A in FIG. 3A, consider a first example of the DV for a driver under the following first driver environment: driving above 30 miles per hour (DV of twenty), during the day (DV of five), in light traffic (DV of five), in a straight line (DV of five), on a familiar route (DV of five), paying attention (DV of five), with no other occupants (DV of five). The overall DV, when the individual DV are summed, is fifty-five. In a second example with a second driver environment, if a driver is driving slowly through any sort of warning area, the lowest DV possible is sixty. In a third example with a third driver environment, driving at five miles per hour outside of a warning area under all of the best conditions yields a DV of forty. In a fourth example with a fourth driver environment, the only driver conditions where an audible notification may be received is when the vehicle is not moving.

In an embodiment, distraction program 144 modifies the incoming notification (step 212). In other words, distraction program 144 uses the determined DV (step 210) in conjunction with a pre-determined rule set to modify an incoming notification to a mobile device. In an embodiment, the pre-determined rule set may be defined by a user and stored to a database repository. In another embodiment, the pre-determined rule set may be defined by a person other than the user (e.g., by a parent for a teenage driver, by an adult for an elderly parent, by an owner of a taxi company for the taxi drivers, etc.) and stored to a database repository. In yet another embodiment, the pre-determined rule set may be defined by an entity (e.g., the United States Postal Service for the delivery personnel) and stored to database repository. In yet another embodiment, distraction program 144 may determine a rule set based on a historical database (not shown) of driver actions, determined DV, and accident history. For example, the historical database may show that accidents occur at a higher than average rate for both audible and vibration type notification so as a result, distraction program 144 only allows audible and vibration notifications when the vehicle is not moving. In an embodiment, the types of notification modification includes keeping the default notification of the mobile device, changing an audible notification to one of a haptic or visual notification, changing a haptic notification to a visual notification, and silencing an audible, haptic, or visual notification (i.e., turning off the notification). According to an embodiment of the present invention, distraction program 144 modifies an incoming notification to a mobile device based on the pre-determined rule set in table 300B in FIG. 3B, which is stored to database repository 142. For several examples, see the next paragraph.

Referring to table 300B in FIG. 3B, note that if a higher distracting notification type is allowed, all of the lower distracting notifications are also allowed. For example, the most distracting notification is an audible notification, followed in order by vibration, visual, and silent. Therefore, if a vibration notification is allowed, a visual notification is also allowed. Consider the first example of the DV for a driver under the following first driver environment: driving above 30 miles per hour (DV of twenty), during the day (DV of five), in light traffic (DV of five), in a straight line (DV of five), on a familiar route (DV of five), paying attention (DV of five), with no other occupants (DV of five). The overall DV, when the individual DV are summed, is fifty-five. Per table 300B in FIG. 3B, a DV of fifty-five results in changing both an audible notification and a vibration notification to a visual notification. In the second example with the second driver environment, if a driver is driving slowly through any sort of warning area, the lowest DV possible is sixty. At a DV of sixty, any type of incoming notification is silenced so that the driver is not distracted in the warning area. In the third example with the third driver environment, driving at five miles per hour outside of a warning area under all of the best driving conditions yields a DV of forty. Referring again to table 300B in FIG. 3B, for a DV of forty, an incoming notification may be changed from audible to vibrate, or a visual notification will be accepted. In the fourth example with the fourth driver environment, the only driver conditions where an audible notification may be received is when the vehicle is not moving (i.e., adding the minimum DV for all driver actions and the driver is not in a warning area yields a DV of forty which results in changing the audible incoming notification).

In an embodiment, a user may be able to disable distraction program 144 so that all notifications are received by the mobile device in the default manner. For example, if another user takes control of the mobile device of the user or if the user is the lone occupant in a self-driving vehicle, the user may disable distraction program 144. In another embodiment, a user may be able to indicate to distraction program 144 that certain notifications will be accepted by the mobile device in the default manner (i.e., distraction program 144 is configurable based on user requirements). For example, a user may indicate to distraction program 144 that phone calls from the wife of the user are to remain as an audible notification (consider a scenario where the user does not want to miss a phone call from a pregnant wife). In yet another embodiment, the DV in table 300A (FIG. 3A) may be automatically increased based on the social media of the user, as analyzed by NLP and any other cognitive techniques known in the art. For example, if a user comments about a situation which temporarily causes the user to feel depressed, the DV may be temporarily increased to prevent driver distraction. In yet another embodiment, a user may adjust the DV in table 300A (FIG. 3A), the DV ranges in table 300B (FIG. 3B), and the notification modification in table 300B (FIG. 3B). In yet another embodiment, a user may be prevented from changing any parameters in table 300A and table 300B (e.g., by a parent or company supervisor).

Figure 4:
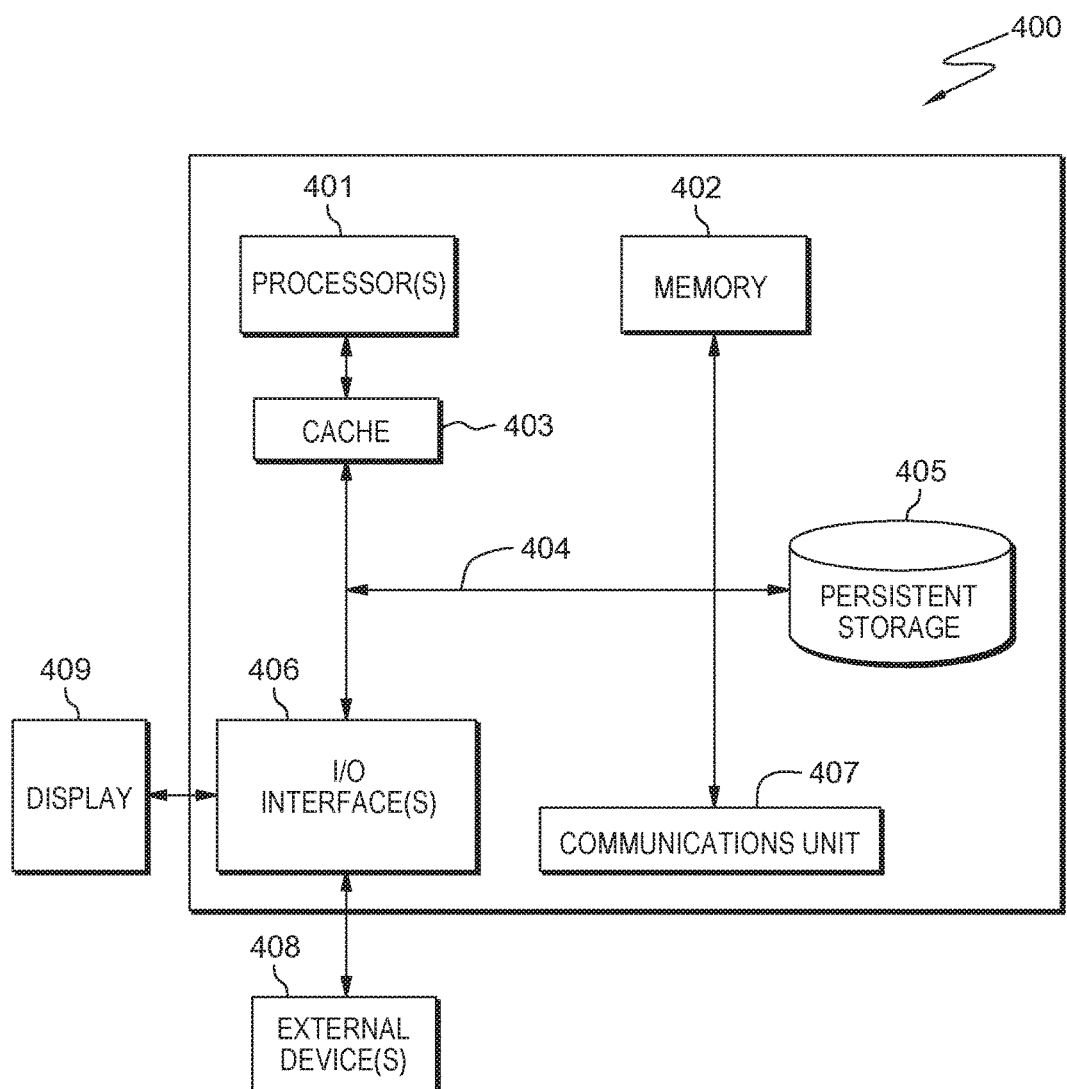
FIG. 4 depicts a block diagram of components of the mobile device of FIG. 1, in accordance with an embodiment of the present invention.

FIG. 4 depicts computer system 400, which is an example of a system that includes distraction program 144. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method for preventing driver distraction from incoming notifications from a mobile device, the method comprising the steps of:
   receiving, by one or more computer processors, an indication that a user has a mobile device and the user is driving a vehicle;
   determining, by one or more computer processors, a distraction value, wherein the distraction value is based on one or more driving actions and a surrounding environment, wherein the distraction value is determined by an algorithm, and wherein the algorithm is selected from the group consisting of summing individual distraction values to determine an overall distraction value and weighting one or more individual distraction values, prior to summing the individual distraction values, to determine the overall distraction value; and
   modifying, by one or more computer processors, an incoming notification on the mobile device based on the determined distraction value.

2. The method of claim 1, wherein the one or more driving actions that require more driver attention are selected from the group consisting of driving through an intersection, driving in heavy traffic with many other vehicles around, driving in poor weather conditions, turning left on a red flashing traffic signal, driving during rush hour, driving a never before driven route, in-car distractions, and situations where a driver may not be paying attention to a road, as monitored by an in-car camera.

3. The method of claim 1, wherein the one or more driving actions that require less driver attention are selected from the group consisting of waiting at a stop light or in a traffic jam, driving over a bridge with no cross streets or turns, driving in light traffic conditions with few other vehicles around, driving late at night with fewer vehicles on a road, and driving on familiar routes.

4. The method of claim 1, further comprising:
   monitoring, by one or more computer processors, the surrounding environment using one or more safety systems found in the vehicle, wherein the safety system is selected from the group consisting of a driver drowsiness detection system, an automatic braking system, an infrared night vision system, an adaptive headlight system, a reverse backup sensor system, a backup camera, an adaptive cruise control system, a lane departure warning system, a tire pressure monitoring system, an electronic stability control system, a traction control system, an anti-lock braking system, an electronic brakeforce distribution system, a cornering brake control system, and an emergency brake assist system.

5. The method of claim 1, wherein the incoming notification is selected from the group consisting of a notification for a phone call, a notification for a short message service text, a notification for a multimedia message service text message, a social media website notification, an e-mail notification, a weather notification, and a news notification.

6. The method of claim 1, wherein the incoming notification modification type is selected from the group consisting of keeping a default notification of the mobile device, changing an audible notification to a haptic notification, changing an audible notification to a visual notification, changing a haptic notification to a visual notification, silencing an audible notification, silencing a haptic notification, and silencing a visual notification.

7. A computer program product for preventing driver distraction from incoming notifications from a mobile device, the computer program product comprising:
   one or more computer readable storage media; and
   program instructions stored on the one or more computer readable storage media, the program instructions comprising:
      program instructions to receive an indication that a user has a mobile device and the user is driving a vehicle;
      program instructions to determine a distraction value, wherein the distraction value is based on one or more driving actions and a surrounding environment, wherein the distraction value is determined by an algorithm, and wherein the algorithm is selected from the group consisting of summing individual distraction values to determine an overall distraction value and weighting one or more individual distraction values, prior to summing the individual distraction values, to determine the overall distraction value; and
      program instructions to modify an incoming notification on the mobile device based on the determined distraction value.

8. The computer program product of claim 7, wherein the one or more driving actions that require more driver attention are selected from the group consisting of driving through an intersection, driving in heavy traffic with many other vehicles around, driving in poor weather conditions, turning left on a red flashing traffic signal, driving during rush hour, driving a never before driven route, in-car distractions, and situations where a driver may not be paying attention to a road, as monitored by an in-car camera.

9. The computer program product of claim 7, wherein the one or more driving actions that require less driver attention are selected from the group consisting of waiting at a stop light or in a traffic jam, driving over a bridge with no cross streets or turns, driving in light traffic conditions with few other vehicles around, driving late at night with fewer vehicles on a road, and driving on familiar routes.

10. The computer program product of claim 7, further comprising program instructions stored on the one or more computer readable storage media, to:
monitor the surrounding environment using one or more safety systems found in the vehicle, wherein the safety system is selected from the group consisting of a driver drowsiness detection system, an automatic braking system, an infrared night vision system, an adaptive headlight system, a reverse backup sensor system, a backup camera, an adaptive cruise control system, a lane departure warning system, a tire pressure monitoring system, an electronic stability control system, a traction control system, an anti-lock braking system, an electronic brakeforce distribution system, a cornering brake control system, and an emergency brake assist system.

11. The computer program product of claim 7, wherein the incoming notification is selected from the group consisting of a notification for a phone call, a notification for a short message service text, a notification for a multimedia message service text message, a social media website notification, an e-mail notification, a weather notification, and a news notification.

12. The computer program product of claim 7, wherein the incoming notification modification type is selected from the group consisting of keeping a default notification of the mobile device, changing an audible notification to a haptic notification, changing an audible notification to a visual notification, changing a haptic notification to a visual notification, silencing an audible notification, silencing a haptic notification, and silencing a visual notification.

13. A computer system for preventing driver distraction from incoming notifications from a mobile device, the computer system comprising:
one or more computer processors;
one or more computer readable storage media; and
program instructions stored on the one or more computer readable storage media for execution by at least one of the one or more computer processors, the program instructions comprising:
program instructions to receive an indication that a user has a mobile device and the user is driving a vehicle;
program instructions to determine a distraction value, wherein the distraction value is based on one or more driving actions and a surrounding environment, wherein the distraction value is determined by an algorithm, and wherein the algorithm is selected from the group consisting of summing individual distraction values to determine an overall distraction value and weighting one or more individual distraction values, prior to summing the individual distraction values, to determine the overall distraction value; and
program instructions to modify an incoming notification on the mobile device based on the determined distraction value.

14. The computer system of claim 13, wherein the one or more driving actions that require more driver attention are selected from the group consisting of driving through an intersection, driving in heavy traffic with many other vehicles around, driving in poor weather conditions, turning left on a red flashing traffic signal, driving during rush hour, driving a never before driven route, in-car distractions, and situations where a driver may not be paying attention to a road, as monitored by an in-car camera.

15. The computer system of claim 13, wherein the one or more driving actions that require less driver attention are selected from the group consisting of waiting at a stop light or in a traffic jam, driving over a bridge with no cross streets or turns, driving in light traffic conditions with few other vehicles around, driving late at night with fewer vehicles on a road, and driving on familiar routes.

16. The computer system of claim 13, further comprising program instructions stored on the one or more computer readable storage media for execution by at least one of the one or more computer processors, to:
monitor the surrounding environment using one or more safety systems found in the vehicle, wherein the safety system is selected from the group consisting of a driver drowsiness detection system, an automatic braking system, an infrared night vision system, an adaptive headlight system, a reverse backup sensor system, a backup camera, an adaptive cruise control system, a lane departure warning system, a tire pressure monitoring system, an electronic stability control system, a traction control system, an anti-lock braking system, an electronic brakeforce distribution system, a cornering brake control system, and an emergency brake assist system.

17. The computer system of claim 13, wherein the incoming notification is selected from the group consisting of a notification for a phone call, a notification for a short message service text, a notification for a multimedia message service text message, a social media website notification, an e-mail notification, a weather notification, and a news notification.

* * * * *